Feb. 13, 1923.

G. F. VOIGHT,
LEVER SHOCK ABSORBER,
FILED OCT. 19, 1918.

INVENTOR.
George F. Voight.

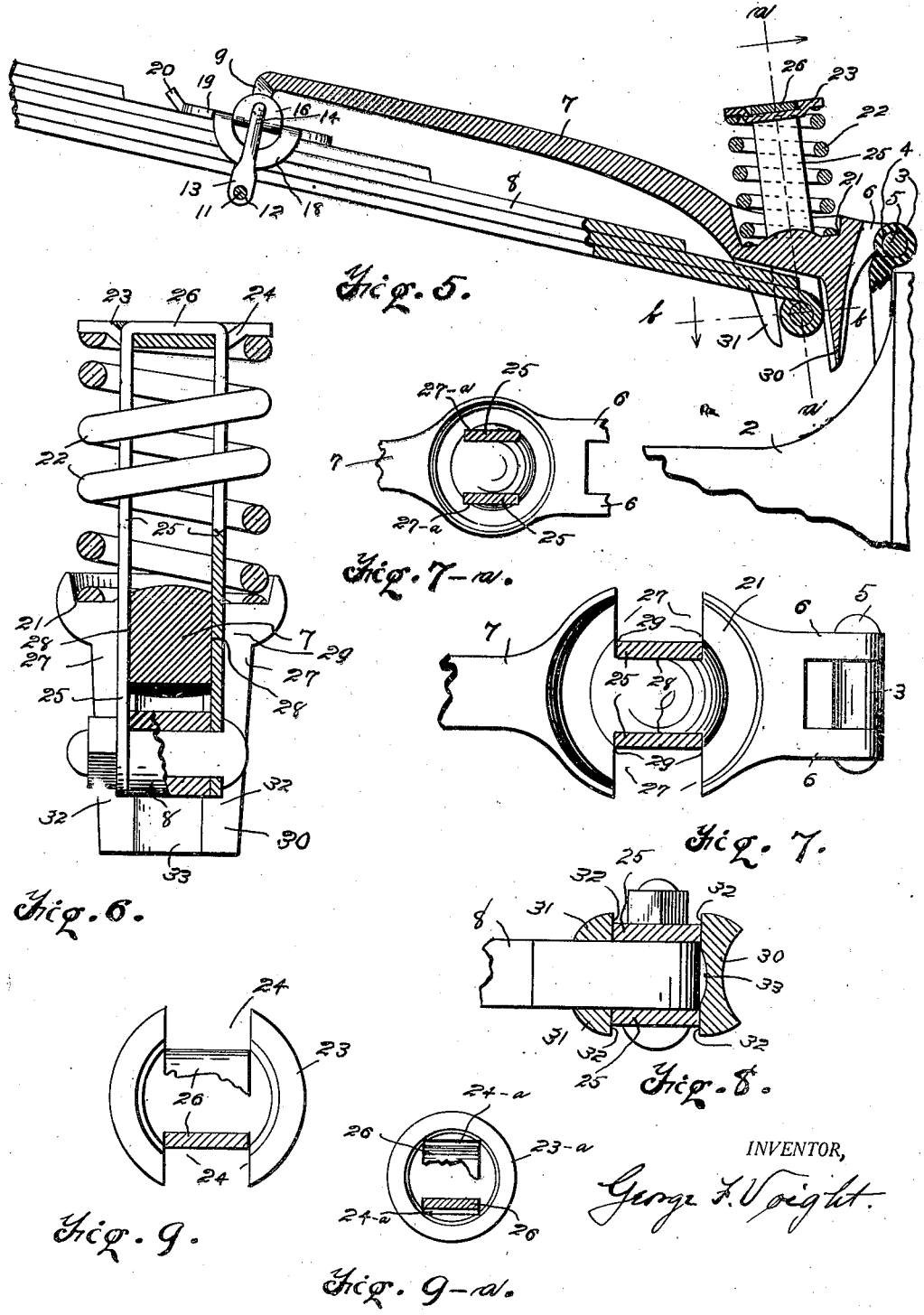

Patented Feb. 13, 1923.

1,445,250

UNITED STATES PATENT OFFICE.

GEORGE F. VOIGHT, OF SAN FRANCISCO, CALIFORNIA, ASSIGNOR TO WALTER S. BURGESS, OF OAK PARK, ILLINOIS.

LEVER SHOCK ABSORBER.

Application filed October 19, 1918. Serial No. 258,803.

*To all whom it may concern:*

Be it known that I, GEORGE F. VOIGHT, a citizen of the United States, residing at San Francisco, in the county of San Francisco and State of California, have invented new and useful Improvements in Lever Shock Absorbers, of which the following is a specification.

My invention relates to improvements in lever shock absorbers of the type in which an oscillatory lever has its outer end pivoted to the vehicle's axle and its inner end supported by a portion of the vehicle movable relatively to the axle, the lever being adapted to support the outer end of the vehicle's principal leaf spring, particularly leaf springs of the type used in connection with the Ford automobile.

An object of my invention is to provide a device of the kind named that is simple and efficient and one that will assist the principal leaf spring in cushioning the vehicle against the unevenness of the road.

With the foregoing and other objects in view which will appear as the description proceeds, my invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:

Figure 5 is a part sectional view of my invention, showing also a portion of the vehicle's axle and leaf spring.

Figure 6 is a sectional view on line *a—a* of Figure 5.

Figure 7 is a top view of a portion of the invention.

Figure 1:
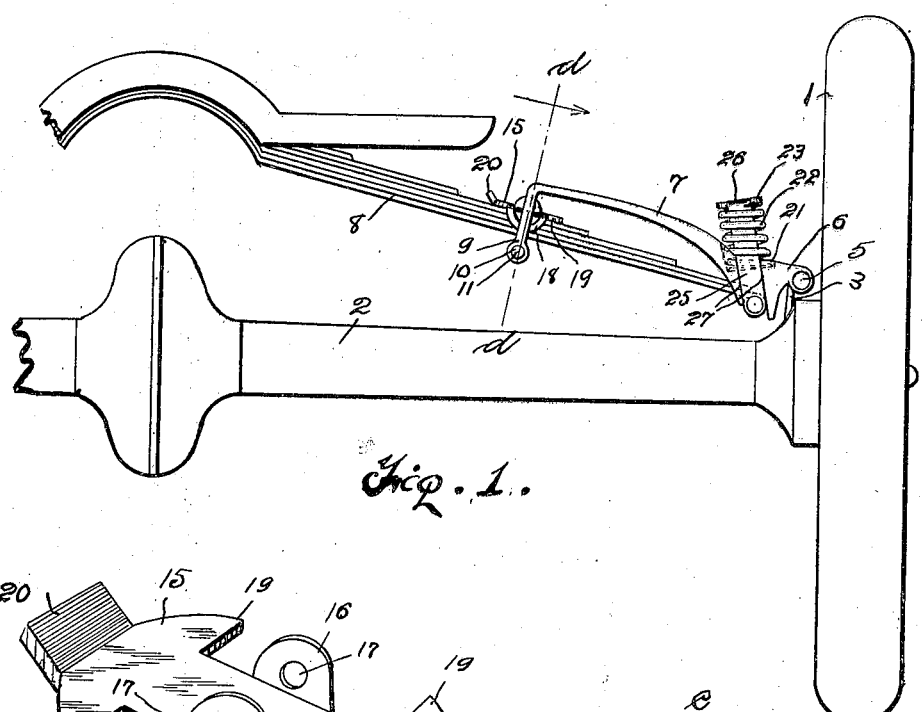
Figure 1 is a view in elevation of a portion of the right hand side of the rear end of an automobile of the Ford type of construction, with my invention applied thereto.
Figure 2:
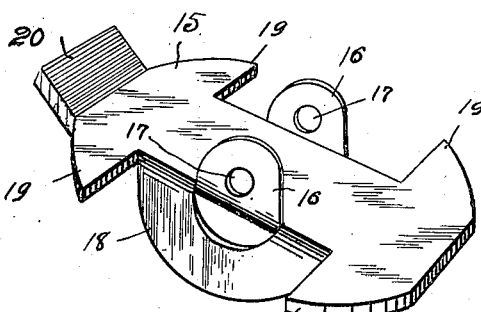
Figure 2 is a view in perspective of a saddle constituting a portion of my invention.
Figure 3:
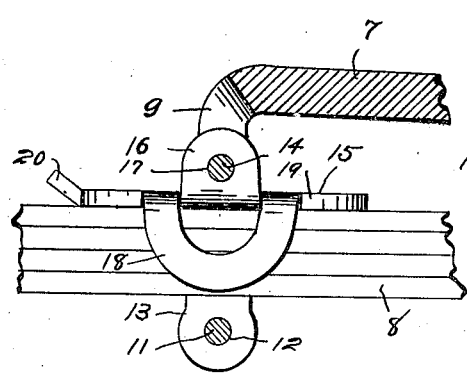
Figure 3 is a partial detail section and elevation approximately on the line *c—c* of Figure 4 showing a fragment of the vehicle's leaf spring.
Figure 4:
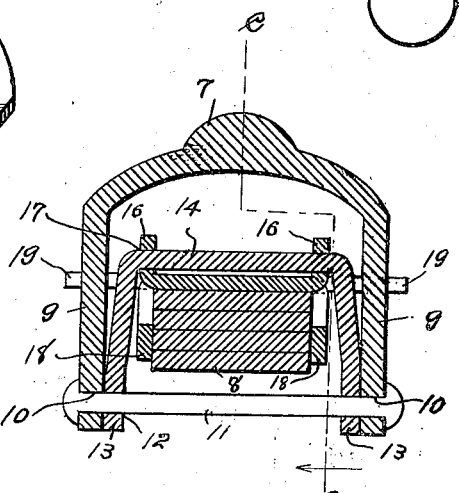
Figure 4 is a sectional view on line *d—d*, Figure 1.

Figure 7ª is a modification of Figure 7.

Figure 8 is a view approximately on line *b—b*, Figure 5.

Figure 9 is a top view of a portion of the invention, a portion thereof being in section and another portion being broken away.

Figure 9ª is a modification of Figure 9.

Like numerals refer to like parts throughout the several figures.

While in the accompanying drawings my invention is shown applied to the right hand side of the rear end of a vehicle, it is to be understood that it is applicable to the left hand as well as to the right hand side and to the front end as well as to rear end of any machine.

Referring to the drawings:

1 designates a wheel supporting one end of an axle provided with an upwardly extending bracket 3 having a transversely extending opening 4 adjacent its upper end to support a pivot pin 5 on which is mounted the free ends of arms 6 forming the outer bifurcated end of an oscillatory lever 7.

The inwardly extending section of the lever 7 is disposed above the vehicle's leaf spring 8 and extends in the general direction thereof.

The leaf spring 8 is disposed above the axle 2 and extends in a general direction therewith.

The inner end of the lever 7 is also bifurcated thereby forming a pair of arms 9 disposed one on each side of the spring 8 and provided at their free ends with openings 10 through which extends a pivot pin 11 disposed below the spring 8 and extending through openings 12 in the lower or free ends 13 of a yoke 14 adapted to straddle the spring 8 from the upper side thereof to thereby form an underslung pivotal support for the lever.

Upon the upper face side of the spring 8 between the arms 9 is slidably disposed a saddle 15 which I preferably stamp out of sheet metal. It has intermediate sections struck upwardly to form a pair of ears 16 provided with openings 17 that rotatable support the upper end portion of the yoke 14, said saddle also has downwardly struck guides 18 disposed one on each side of the spring 8 to hold the saddle laterally in place, while permitting it to slide longitudinally of the spring. The saddle also has laterally extending projections 19 which are engageable with the arms 9 for restricting the longitudinal movement of the saddle 15 upon the spring 8. The saddle terminates in an upwardly deflected lip 20 adapted to assist the saddle 15 to mount any obstruction that may be upon the spring 8, as the end of a spring leaf.

From the foregoing it is obvious that the saddle may pivotally support the yoke 14, that the yoke may pivotally support the arms 9 by means of the pivot pin 11 and that the projections 19 may engage the arms 9 to limit the longitudinal movements of the saddle 15 upon the spring 8 relatively to the lever 7. It is further obvious that the guides 18 may restrict the saddle 15 in any sidewise movement relatively to the spring 8 and that the pivot pin 11 may prevent the saddle 15 from being lifted up to any great extent from the spring 8.

The upper side of the lever 7 adjacent its outer bifurcated end is provided with a spring seat 21 upon which is seated the lower end of a coil compression spring 22 supporting upon its upper end a substantially circular centrally downwardly dished cap or follower 23 having two oppositely disposed slots 24 through which pass downwardly extending arms 25 of a hanger 26. The intermediate section of the hanger is seated upon and is supported by the central dished portion of the cap 23.

The arms 25 of the hanger 26 extend downwardly through the spring 22 with their ends projecting out of the lower end thereof and are slidably disposed in recesses 27 cut in the sides of the lever 7 and extending from the upper to the lower edges thereof and having faced sides 28 adjacent the sides of the arms 25 and faced edges 29 adjacent the edges of said arms 25.

To the lower free ends of the arms 25 is pivotally attached the outer end of the leaf spring 8. The tension of the coil spring 22 being adapted to normally resiliently support the spring 8.

Upon the lower side of the lever 7 is disposed a principal guide lug 30 disposed at the end of the spring 8 and two minor guide lugs 31 disposed one at each side of the spring 8. Said lugs have faced edges 32 in alignment with registering faced edges 29 of the recesses 27 and are adapted to guide the lower ends of the arms 25 in their upwardly and downwardly movements below the recesses 27. The lugs 31 are also adapted as side guides between which the spring 8 may move upwardly and downwardly.

In order to protect the end of the spring 8 against wear against the lug 30, the lug may be concaved as at 33.

When either the spring 8 or the axle 2 for any reason are forced in the direction of the other, as when the wheel of the vehicle passes over an obstruction or when it suddenly falls into a depression, either of said forced movements of the said spring or axle will cause the spring to become deflected whereby its outer end will be moved outwardly in proportion to the degree of said deflection, and in order to allow for the free outward movement of said outer end of said spring when it is so deflected I tilt the longitudinal axis of the coil spring 22 inwardly at the top end and outwardly at the lower end. The tilting of said axis is automatically increased as the inner end of the lever 7 moves downwardly with the downward movement of its support.

The guide lugs 30 and 31 and the recesses 27 are arranged in such a manner relatively to the axis of the coil spring 22 that the upward and downward movements of the hanger 26 will at all times be in alignment with the axis of said coil spring 22.

The said inwardly tilting of the upper end of said coil spring 22 and the alignment therewith of the upward and downward movements of the hanger 26 in its support of the outer end of the leaf spring 8 constitutes one of the principal objects of the present invention.

In the modification of the invention shown in Figure 7ª, the recesses cut in the sides of the lever 7 do not extend through to the top of the lever but terminate in slotted openings 27ª through which slidably extend the arms 25 of the hanger 26. In the modification shown in Figure 9ª slotted openings 24ª extending through the cap 23ª are substituted for the cut away portions designated by 24 in the regular or preferred form of the invention.

It is to be noted that throughout the foregoing specification and the claims following, the terms "outer" and "outwardly" shall indicate respectively —farthest away from— and —in a direction away from— the median vertical plane extending longitudinally through the vehicle, and the terms "inner" and "inwardly" shall respectively indicate —nearest to— and —in a direction toward— said plane.

I claim:

1. In a lever shock absorber, a lever pivotally supported at its outer end and intermediate its ends supporting one end of the vehicle's leaf spring, and an undersluing pivotal connection between the inner end of the lever and the leaf spring intermediate its ends, said connection comprising a plurality of elements pivotally connected together above the pivotal connection with the lever arm and interposed between said inner end of the lever and said leaf spring.

2. In a lever shock absorber, a lever pivotally supported at its outer end and intermediate its ends supporting one end of the vehicle's leaf spring, and an undersluing pivotal connection between the inner end of said lever and the leaf spring intermediate its ends, said connection embodying a plurality of inelastic elements pivotally connected together above the pivotal connection with the lever arm and interposed between said inner end of the lever and said spring.

3. A lever shock absorber comprising a lever pivotally supported at its outer end and supporting intermediate its ends one end of the vehicle's leaf spring, and a connection between the inner end of said lever and the leaf spring intermediate the ends thereof, said connection embodying means slidably disposed upon the leaf spring and inelastic means having a portion supported by said first named means and movable relatively thereto and another portion supporting said inner end of the lever and movable relatively thereto and adapted to hold the inner end of the lever substantially rising from the leaf spring.

4. A lever shock absorber comprising a lever pivotally supported at its outer end and resiliently supporting intermediate its ends one end of the vehicle's leaf spring, and a connection between the inner end of said lever and the leaf spring intermediate the ends thereof, said connection embodying means carried by said leaf spring and a pair of links pivotally supported by said means and having portions pivotally connected to said inner end of the lever below, and adapted to hold the inner end of the lever substantially from rising away from the leaf spring.

5. A lever shock absorber comprising a lever pivotally supported at its outer end and supporting intermediate its ends one end of the vehicle's leaf spring, and a connection between the inner end of said lever and the spring intermediate the ends thereof, said connection comprising a saddle carried by said leaf spring and underlying the said inner end of the lever, and a pair of rigid links having ends pivotally supported by said saddle and pivotally connected at their other ends to said inner end of the lever below the leaf spring.

6. In combination, an oscillatory lever, a pivotal connection between the outer end of the lever and the axle of the vehicle, a resilient connection between the lever intermediate the ends thereof and one end of the vehicle's leaf spring, a saddle disposed upon said leaf spring intermediate the ends thereof and longitudinally slidable thereon, said saddle being adapted to support the inner end of said lever, and means carried by said saddle engageable with a portion of said lever for limiting the slidable movements of said saddle upon said leaf spring.

7. In combination, an oscillatory lever pivoted at its outer end to the axle of the vehicle, a resilient connection between said lever intermediate the ends thereof and one end of the vehicle's leaf spring, a saddle disposed on said leaf spring intermediate its ends and movable relatively thereto, and a link having one end pivotally supported by said saddle and its other end supporting said inner end of the lever and movable relatively thereto.

8. In combination, a lever having its outer end pivoted on the axle of the vehicle, a resilient connection between the lever intermediate its ends and one end of the vehicle's leaf spring, the inner end of the lever terminating in a pair of arms disposed one on each side of said leaf spring, a saddle disposed upon said leaf spring intermediate its ends and longitudinally slidable thereon, and a connection between the free ends of said arms and said saddle extending transversely beneath said leaf spring whereby the latter may support the former.

9. In combination, an oscillatory lever having its outer end pivoted to the axle of the vehicle, a resilient connection between the lever intermediate its ends and one end of the vehicle's leaf spring, the inner end of the lever terminating in a pair of arms disposed one on each side of said leaf spring and movable relatively thereto, a saddle disposed upon said leaf spring and longitudinally slidable thereon, a U-shaped link supported on said saddle and straddling said leaf spring and a bolt below said leaf springs extending through said arms and the free ends of the arms of said U-shaped link.

10. In combination, a lever pivoted at its outer end upon the vehicle's axle, a spring carried by said lever intermediate its ends, a connection between said spring and one end of the vehicle's leaf spring, the inner end of said lever terminating in a pair of arms disposed one on each side of the leaf spring, a saddle longitudinally slidable upon said leaf spring, means pivotally mounted upon said saddle for supporting the said free ends of said arms, and means rigidly connected to said saddle for engaging a portion of said lever for limiting the longitudinal movements of said saddle upon said leaf spring.

11. The combination with the axle and leaf spring of a vehicle, of a lever pivoted at its outer end to said axle, a connection between the lever intermediate its ends and one end of the leaf spring, the inner end of the lever terminating in a pair of arms disposed one on each side of said leaf spring, a saddle longitudinally slidably disposed upon the leaf spring intermediate the ends thereof, means pivotally supported by said saddle, a pivotal connection between said means and the free ends of said arms, and projections rigidly supported by the saddle adapted to engage said lever when said saddle is moved a proper distance in either direction relatively to the longitudinal axis of said lever.

12. The combination with the axle and leaf spring of a vehicle, of a rigid lever pivoted at its outer end to said axle, a pivotal connection between the lever intermediate the ends thereof and one end of the leaf spring, the inner end of the lever terminating in a pair of arms having their free ends spaced apart and disposed one on each side of said leaf spring, a saddle disposed upon said leaf spring, side pieces on the sides of said saddle engageable with the sides of said leaf spring for restricting the transverse movements of said saddle relatively to said leaf spring, means pivotally supported by said saddle, and a pivotal connection between said means and the free ends of said arms below the leaf spring.

13. The combination with the axle and leaf spring of a vehicle, of a lever pivoted to said axle, a connection between the said lever intermediate the ends thereof and one end of said leaf spring, the inner end of the lever terminating in a pair of arms having their free ends spaced apart and disposed one on each side of said leaf spring and movable relatively thereto, a saddle longitudinally slidably disposed upon said leaf spring, a plurality of projections carried by said saddle and extending therefrom, a plurality of said projections being engageable with a portion of said lever for limiting the longitudinal slidable movement of said saddle upon said leaf spring in one direction, a plurality of said projections being engageable with a portion of said lever for limiting the longitudinal slidable movement of said saddle upon said leaf spring in the opposite direction, a yoke straddling said saddle and pivotally supported thereby, and a pivotal connection between the free ends of said yoke and the free ends of said arms.

14. The combination with the axle and leaf spring of a vehicle, of a lever pivoted at its outer end to said axle, a connection between the lever intermediate the ends thereof and one end of said leaf spring, a saddle longitudinally slidable upon said leaf spring intermediate the ends thereof, interacting stops on said saddle and lever to limit movement of the saddle on said spring, and a connection between said saddle and the inner end of said lever.

15. The combination with the axle and leaf spring of a vehicle, of a lever pivotally supported at its outer end by the axle, a connection between the lever intermediate the ends thereof and one end of the leaf spring, a saddle longitudinally slidable upon said leaf spring intermediate the ends thereof, a lip on the inner end of the saddle having its free end deflected upwardly from said leaf spring, and a rigid link connection between said saddle and the inner end of said lever, embracing interacting stops on said parts.

16. In combination, a leaf spring, a longitudinally slidable saddle disposed thereon, and having means to pivotally connect it to said lever below said leaf spring, a lip on the inner end of the saddle, said lip having its free end spaced apart from said leaf spring, and side pieces on the sides of the saddle struck downwardly and disposed one on each side of said leaf spring.

17. The combination with a vehicle having an axle and a leaf spring disposed above said axle and extending in a general direction therewith, of a rigid lever having its outer end pivotally attached to said axle and having a relatively movable support for its other end, a pair of oppositely disposed recesses cut in said lever intermediate its ends and extending from the upper to the lower side thereof, means slidably disposed in said recesses and having portions projecting above and below the longitudinal axis of said lever, a compression spring confined between one end of said means and said lever, and a pivotal connection between the other end of said means and one end of said leaf spring below the general plane of said leaf spring.

18. The combination with a vehicle having an axle and a leaf spring disposed above said axle and extending in a general direction therewith, of a lever having its outer end pivotally supported by said axle and having a relatively movable support for its other end, a pair of oppositely disposed recesses cut in said lever intermediate its ends, means slidably disposed in said recesses and having portions projecting above and below the longitudinal axis of the lever, a spiral compression spring above said levers and confined between the upper end of said means and said lever, and a pivotal connection between the lower end of said means and one end of said leaf spring.

19. The combination with a vehicle having an axle and a leaf spring disposed above said axle and extending in a general direction therewith, of a lever having its outer end pivotally supported by said axle and having a relatively movable support for its other end, said lever being provided with oppositely disposed recesses, a spiral compression spring having its lower end seated upon said lever intermediate the ends thereof, a cap seated upon the upper end of said spiral spring, a pair of spaced apart links slidable in said recesses and having their upper ends supported by said cap and having their lower end projecting below the axis of said lever, and a pivotal connection between said lower ends of the links and one end of said leaf spring.

20. The combination with a vehicle having an axle and a leaf spring disposed above said axle and extending in a general direction therewith, of a lever having its outer end pivotally supported by said axle and having a relatively movable support for its inner end, a spiral compression spring having its lower end seated upon said lever intermediate the ends thereof, a cap seated upon the upper end of said spiral spring, and a yoke straddling said lever and having a portion attached to said cap, the free ends of said yoke being disposed one on each side of one end of said leaf spring and pivotally attached at their lower ends thereto.

21. The combination with a vehicle having an axle and a leaf spring overhanging same and extending in general direction therewith, of a lever having its outer end pivotally attached to said axle and supporting intermediate its ends one end of said leaf spring, a saddle having a substantially lower flat side slidably disposed on said leaf spring, and means supported by said saddle pivotally connected to said inner end of the lever below the leaf spring to constitute an underslung support, said means being movable relatively to both said saddle and said lever, with means to limit relative movement of said saddle and lever.

22. The combination with a vehicle having an axle and a leaf spring overhanging the axle and extending in a general direction therewith, of an oscillatory lever having its outer end arranged to be pivotally supported by said axle and intermediate its ends resiliently supporting one end of said leaf spring, a saddle having a substantially lower flat side disposed on said leaf spring adjacent the inner end of said lever, and a pair of rigid links having their upper ends supported by said saddle and their lower ends pivotally connected to the inner end of the lever by a member extending transversely beneath the leaf spring.

23. The combination with a vehicle having an axle and a leaf spring overhanging said axle and extending in a general direction therewith, of a rigid oscillatory lever having its outer end fulcrumed upon said axle, a spiral compression spring carried by the lever between its ends, a pivotal connection between one end of said leaf spring and said spiral spring whereby the latter may yieldingly support the former, a saddle carried by said leaf spring adjacent the inner end of said lever, and inelastic oscillatable means interposed between said inner end of the lever and said saddle whereby the saddle may relatively movably support said inner end of the lever, said means being movable relatively to both the saddle and the inner end of the lever and supporting the latter below the leaf spring.

24. The combination with a vehicle having an axle and a leaf spring disposed above the axle and extending in a general direction therewith, of a rigid oscillatory lever having its outer end pivotally supported by said axle and having a portion overhanging the outer end of said leaf spring, a coil spring carried by the lever intermediate its ends, a link connection between said coil spring and said end of the leaf spring, a saddle having a substantially flat lower side disposed on said leaf spring adjacent the inner end of said lever and normally movable relatively to both said leaf spring and said lever along a line extending approximately parallel with the longitudinal axes thereof, and a pair of rigid links having their upper ends supported by said saddle above said leaf spring and their lower ends supporting said inner end of the lever below said leaf spring, said links being movable relative to both said saddle and said lever.

25. The combination with a vehicle having a leaf spring overhanging its axle and extending in a general direction therewith, of a rigid lever having its outer end arranged to be fulcrumed upon said axle and having a portion overhanging one end of said leaf spring, a spiral compression spring seated upon the lever between its ends, a link connection between said end of the leaf spring and said spiral spring whereby the latter may resiliently support the former, the inner end of said lever being bifurcated thereby forming a pair of arms disposed one on each side of said leaf spring and having their free ends attached below the leaf spring to a pair of inelastic links movable relatively thereto, and a pivotal connection between a portion of said links and means carried by said leaf spring.

26. In a shock absorber, a saddle for the purpose set forth, embracing a plate having upstanding, apertured, opposite pivot lugs, and provided with downwardly bent members adapted to embrace the sides of a leaf spring.

27. In a shock absorber, a saddle for the purpose set forth, embracing a plate having upstanding, apertured, opposite pivot lugs, and provided with downwardly bent members adapted to embrace the sides of a leaf spring, said members being provided with pairs of opposing stop shoulders disposed outwardly from the planes of said downwardly bent members.

28. The combination with a lever having means to pivot its end to an axle assembly and adapted to extend at its other end lengthwise over a body spring, and means adapted to support the latter end on a part of a vehicle subject to rebound, of a coiled spring seated on said lever near its pivot end, oblique tension means acting on said spring and pivoted to the said body spring, said lever being provided with depending, spaced guide arms to form between them a guide space in line with said tension member to receive the connection between said body spring and tension member.

29. The combination with a lever having means to pivot its end to an axle assembly and adapted to extend at its other end lengthwise over a body spring, and means adapted to support the latter end on a part of a vehicle subject to rebound, of a coiled spring seated on said lever near its pivot end, oblique tension means acting on said spring and pivoted to the said body spring, said lever being provided with depending, spaced guide arms to form between them a guide space in line with said tension member to receive the connection between said body spring and tension member, said lever being formed above said guide space with oppositely disposed guide recesses to receive said tension members.

30. In combination, an axle assembly, a body spring above and parallel therewith, a lever pivoted at its outer end to the axle assembly and supported at its inner end on a part of the vehicle subject to rebound, a spring seated on said lever, tension means connecting said spring to the end of the body spring, and a guide for said connection rigid with said lever and at all times parallel to said tension member, for the purpose set forth.

GEORGE F. VOIGHT.